(No Model.) 3 Sheets—Sheet 1.
F. C. GOODWIN & G. A. STEIN.
ROTARY FLUID METER.
No. 582,280. Patented May 11, 1897.
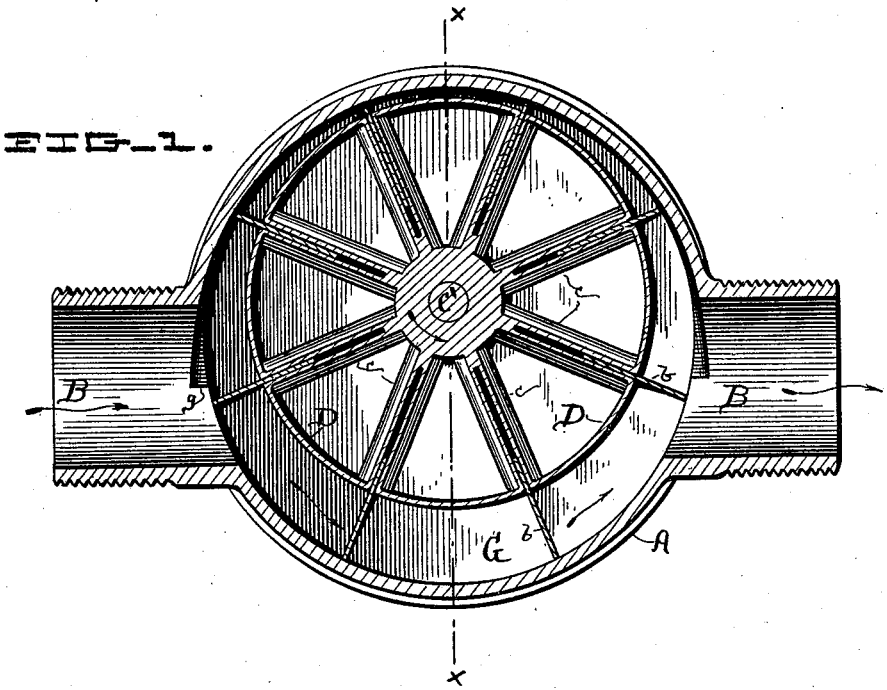
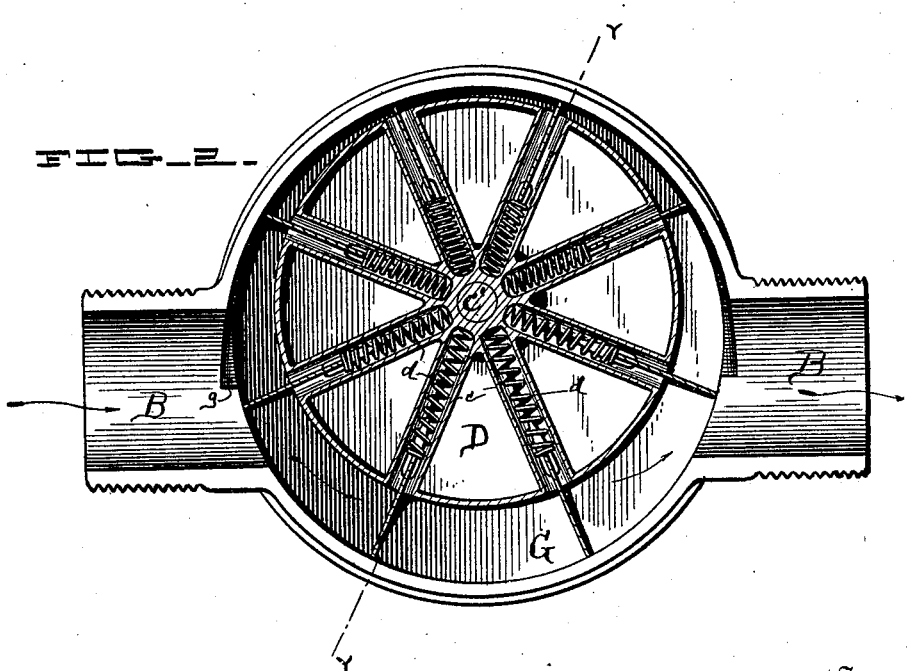

(No Model.) 3 Sheets—Sheet 2.

F. C. GOODWIN & G. A. STEIN.
ROTARY FLUID METER.

No. 582,280. Patented May 11, 1897.

Witnesses
H. G. Nealy.
Emma Slater.

Inventors
F. C. Goodwin &
G. A. Stein
By Attorney F. H. Gibbs (No Model.) 3 Sheets—Sheet 3.

F. C. GOODWIN & G. A. STEIN.
ROTARY FLUID METER.

No. 582,280. Patented May 11, 1897.

Witnesses
H. B. Nealy.
Emma Slater

Inventors
F. C. Goodwin &
G. A. Stein
By Attorney
F. H. C. Gibbs

UNITED STATES PATENT OFFICE.

FREDERICK C. GOODWIN AND GUSTAV ADOLPH STEIN, OF LOUISVILLE, KENTUCKY.

ROTARY FLUID-METER.

SPECIFICATION forming part of Letters Patent No. 582,280, dated May 11, 1897.

Application filed July 22, 1893. Serial No. 481,228. (No model.)

*To all whom it may concern:*

Be it known that we, FREDERICK C. GOODWIN and GUSTAV ADOLPH STEIN, of Louisville, in the county of Jefferson and State of Kentucky, have invented new and useful Improvements in Rotary Fluid-Meters, of which the following, taken in connection with the accompanying drawings, is a full, clear, and exact description.

This invention relates to improvements in fluid-meters designed for measuring the contents of supply-tanks into which liquid is pumped through pipes with which the meter is connected; and it consists in certain particularities of detail construction and combination of parts, all as hereinafter more particularly set forth, and specifically pointed out in the claim.

In the annexed drawings similar letters of reference denote corresponding parts in all the views, in which—

Figure 3:
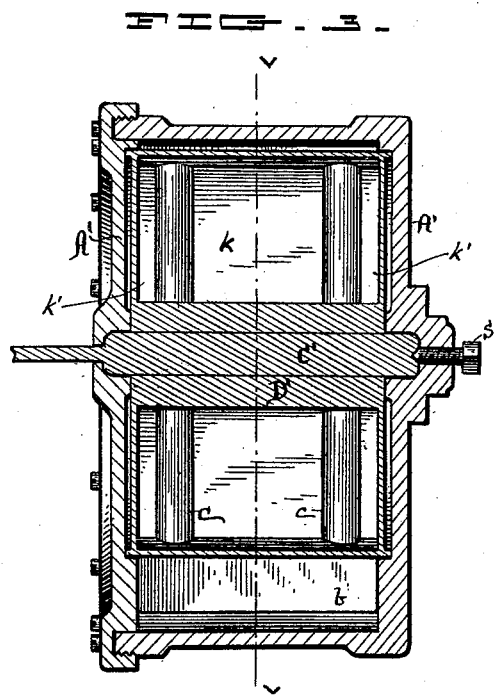
Figure 4:
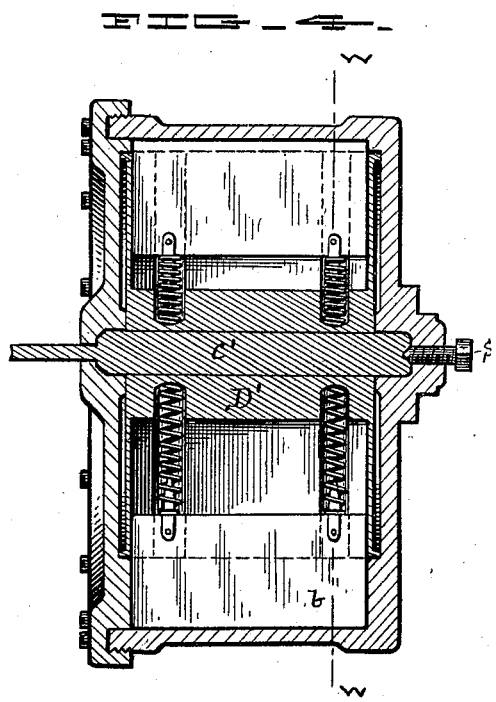
Figure 5:
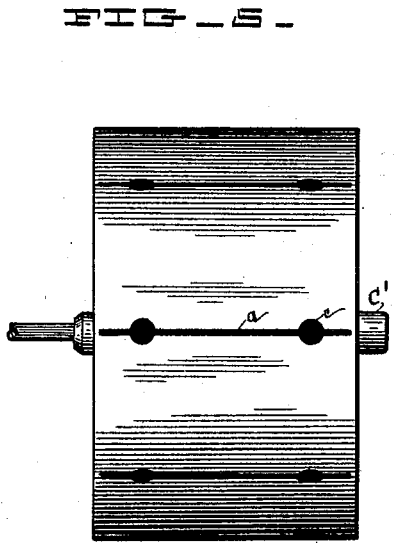
Figure 6:
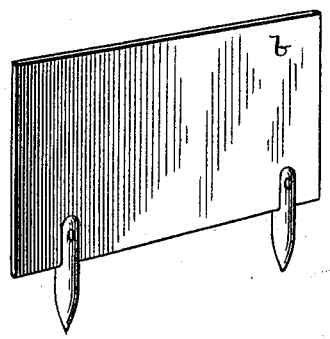
Figure 7:
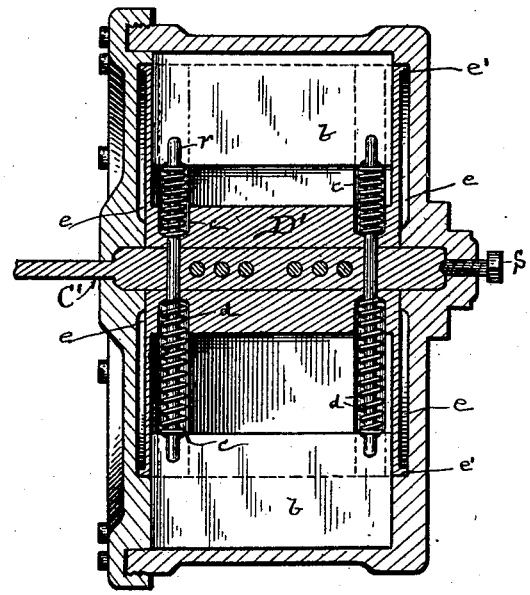
Figure 8:
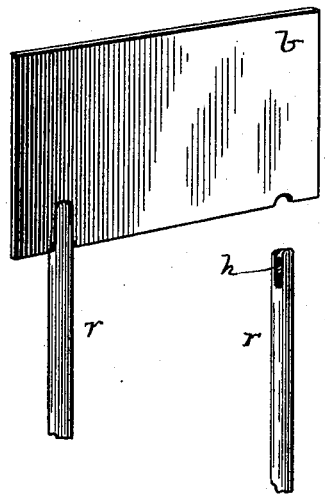

Figure 1 is a horizontal transverse section on line V V of Fig. 3. Fig. 2 is a similar section on line W W of Fig. 4. Fig. 3 is a vertical section on line X X of Fig. 1. Fig. 4 is a vertical section on line Y Y of Fig. 2. Fig. 5 is an exterior view of the inner drum or shell. Fig. 6 is a detached view of one form of gate. Fig. 7 is a transverse vertical section similar to Fig. 4, but showing a slight modification. Fig. 8 shows the gate and gate-rods for the meter of Fig. 7.

In the meter constituting the present invention there is a fixed outer shell A, provided with suitable ingress or egress ports B B, each of which at the proper time is an ingress or egress port, according to the direction in which the fluid is carried through it in filling or emptying the tanks or other receptacle with which it may be used. Within this shell A is another shell or drum D, revoluble on an axis held centrally therein, said drum having closed ends and consisting of a solid central portion or core, a series of wings radiating therefrom, and an outer covering.

The cover has therein a series of longitudinal slots $a$, (see Fig. 5,) which open into radial recesses $k$ of the said wings. Seated loosely in said slots and recesses are gates $b$. The said recesses and slots are enlarged near each end to form tubular pockets $c$, which extend into the central portion or core and in which are seated expansion-springs $d$, whose inner ends abut against the interior of said pockets at one end and against the inner faces of said gates $b$ at the opposite end, the tendency of said springs being at all times to project said gates to the extreme limit of extension beyond the circumferential face of the shell D and forcing said gates at all times into contact with the inner face of the outer shell A. The shell or drum D is set eccentrically within the outer shell A, so that one portion of the shell or drum D is in close proximity to one portion of said interior wall, while the portion at the opposite side is held at some distance from the interior wall of the outer shell A.

Where it is found desirable, the drum D may be made of cast metal with the central portion D' solid, except at its center, for the axis C', or the drum D may be made of sheet metal. Sheet metal is preferable for many reasons; but regardless of how the central drum D is made it is essential to the spirit of this invention that the central portion thereof shall be so closed as to positively prevent the passage of fluid through said drum from side to side, as such passage would in great measure destroy the efficiency of the meter and render a calculation based upon its normal capacity of little value, and to that end it is preferred that the central shell or drum D shall be made of sheet metal, built up with great care and secured to the central portion D.

From port to port B B is an open channel G, through which fluid may pass when desired. The capacity of this fluid-channel from port to port being calculated by the number and position of the gates $b$ it will be readily apparent that any suitable register may be connected to the post C', and the number of revolutions determined by suitable registering devices will indicate the quantity of fluid passed through the meter in any given direction; but as the meter is adapted to operate in both directions and is adapted to be used in any system where the fluid passes into storage-tanks through the meter in one direction, through a supply-pipe while filling storage-tanks, and the supply for local distribution is taken off from the same pipe, it will be apparent that any amount registered by the meter, when supply-tanks are filled will be the basis from which deductions must be made in drawing off the supply; and the meter being connected to registering devices when traveling in both directions, it will be apparent that the amount indicated, at a given time, by such counting-register will be the amount of fluid contained in the supply-tanks, so that the quantity of oil originally charged to the tanks should balance with the amount withdrawn plus the quantity remaining in the tanks, as indicated by the meter.

The top and bottom plates A' are recessed, as shown in the sectional views, Figs. 3, 4, and 7, and said recesses correspond to the location of the drum D within the outer shell, while the gates $b$ are free to project from side to side within said outer shell.

A supplemental channel $g$ of less height than the distance from top to bottom plate is formed at both ports B B within the inner face of shell A, said supplemental channel being deepest at the center of said ports and gradually closing toward the point where the drum D comes in closest proximity to the inner face of the shell A, the object being to provide a supplemental escape-channel through which may pass any oil or other fluid carried by the gates $b$ beyond the line of the ports B B, and thus prevent the compression of said fluid, which otherwise would result, at the closed side of the passage between the drum D and shell A, which would have a tendency to retard the revolution of the said drum D with its stop-gates $b$, for it is clear that were the supplementary channel $g$ not provided, or some suitable means for carrying off the excess of fluid inclosed between two adjacent gates $b$, revolving through the upper portion of their path, then, since the space inclosed between the drum D, the shell A, and the two adjacent gates $b$ decreases as the gates rise above the outlet B, any fluid inclosed within such space would be compelled to undergo compression and the drum would be retarded in its revolution.

A further important improvement embodied in our meter is that a space is left between the drum and the shell A on the upper side of the meter. In a fluid-meter for use where the pressure through the pipes is small it is of great importance that the meter should offer the slightest possible resistance to the flow of the liquid. This minimum resistance is attained by arranging the drum D within the shell A, so that there shall be an intervening space between them in the upper or backward passage between the drum and shell. This feature in conjunction with the escape or relief channel $g$ is found to be of great importance in producing a fluid-meter which has no preceptible retarding influence upon the flow of the liquid.

The central post or axis is provided with a compensating-screw S, held adjustably within the base of the meter, so as to provide a means of compensation for wear naturally incident to use.

It will be apparent that a meter is here provided which is simple in its operation and very durable, which may readily be attached to any feed-supply pipe, will at all times indicate the contents of the supply-tanks, and which, by means of the closed central portion D' of the inner drum D, will positively prevent the passage of fluid through said drum, thus causing accurate measurement of all fluid passed into or from said supply-tanks; and especial attention is directed to said central closed portion D', because by means of it a meter possessing elements of safety in measurement is provided, which is not provided by other forms of meters now in the market adapted to register while traveling in either direction.

The spring-pockets $c$, before described, form a perfectly secure seat for the springs which bear against the inner edges of the gates $b$ to distendt hem to the maximum play permitted by the channel G while they are projected at that side of the drum D and to secure projection of said gates to the limit of the play permitted by the inner face of the outer shell A.

With ordinary oils no additional means would be required to secure projection of said gates, but in some instances the meter may be called upon to measure heavy viscid fluids, in which case the rods $r\ r$ of Figs. 7 and 8 will be found to be of service in projecting the gates into the fluid-channel G. These rods $r\ r$ are slotted vertically at each end and are projected through openings through C' and D', being fitted snugly therein, so as to prevent the passage of oils through the openings formed for said rods $r$. The meter of Fig. 7 has springs $d$ on the rods $r$, which bear against the rear edges of the gates $b$, and with the rods $r$ cause perfect projection of said gate into the channel G at all times, while the bifurcated ends are provided so that the gates $b$ may be capable of radial projection under the action of the springs $d$ when arriving at the channel G, and yet retain their engagement with the rods $r$, the gates and rods not being secured together.

Since the center of the drum D is eccentric to the shell A, it follows that the distance between the outer edges of diametrically opposite gates $b$ varies with the angular position of said gates, it being a maximum when the gates are vertical in the figure and a minimum when they are horizontal. If, then, an opposite pair of gates were rigidly secured to the rod $r$, rotation would be impossible under the above well-known geometrical law. To avoid this difficulty, we bifurcate the ends of the rods to provide recesses, in which the gates $b$ may have slight play.

Having described the invention, what is claimed as new is—

In a fluid-meter the combination with an outer shell, of the rotary drum journaled therein, said drum having a solid central portion or core, a series of wings radiating therefrom, an outer covering and closed ends, said cover having therein a series of longitudinal slots opening into radial recesses of said wings, said slots and recesses being enlarged near each end portion to form spring-pockets which extend into said central portion or core, the gates seated loosely in said slots and recesses, the springs seated in said pockets and bearing against the inner edges of the gates, and the guide-rods around which said springs are coiled and whose outer ends are slotted to engage the gates, substantially as specified.

In testimony whereof we have hereunto signed our names, in the presence of two attesting witnesses, at Louisville, in the county of Jefferson, in the State of Kentucky, this 17th day of July, 1893.

FREDERICK C. GOODWIN.
   GUSTAV ADOLPH STEIN.

Witnesses:
 FREDERICK H. GIBBS,
 EMMA SLATER.